INVENTOR
LEONARD G. TURK

Jan. 6, 1970     L. G. TURK     3,487,507
ACTUATING DEVICE AND CONTROL FOR TIRE CURING PRESS
Filed Nov. 29, 1967     3 Sheets-Sheet 3
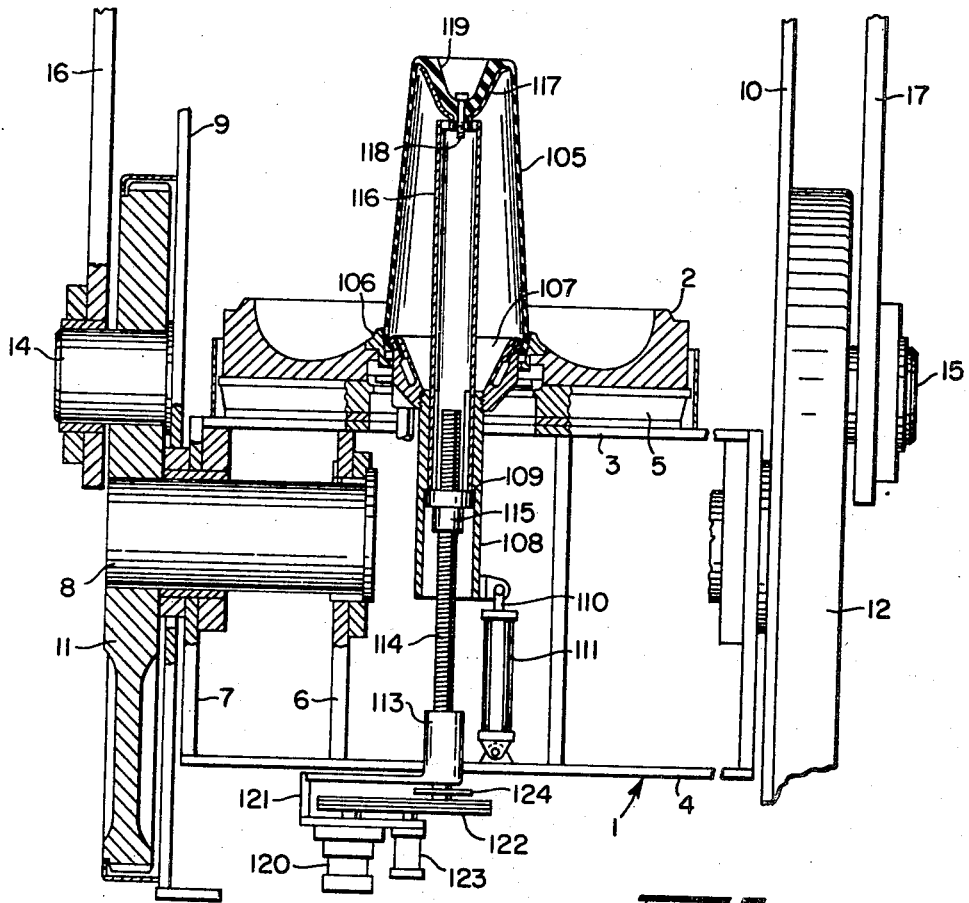
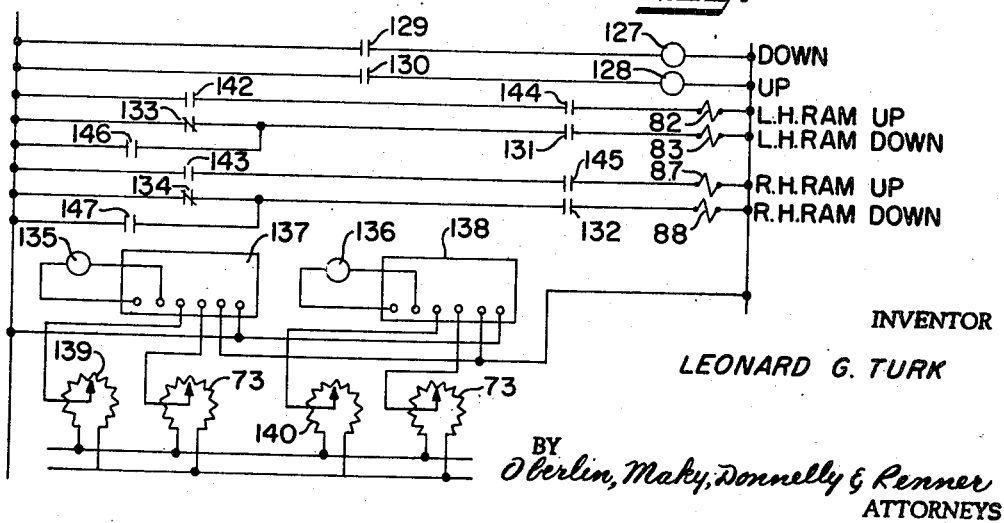
INVENTOR
LEONARD G. TURK
BY
*Oberlin, Maky, Donnelly & Renner*
ATTORNEYS

United States Patent Office 3,487,507
Patented Jan. 6, 1970

3,487,507
ACTUATING DEVICE AND CONTROL FOR TIRE
CURING PRESS
Leonard G. Turk, Akron, Ohio, assignor to NRM
Corporation, Akron, Ohio, a corporation of Ohio
Filed Nov. 29, 1967, Ser. No. 686,593
Int. Cl. B29h 5/02
U.S. Cl. 18—17         10 Claims

ABSTRACT OF THE DISCLOSURE

An elongated vertically movable actuating device for a tire curing press which may be employed to operate and control the extent of movement of a bladder ram, tire stripping chuck, loader, or center mechanism operating in association with upper and lower tire mold sections which are relatively movable for opening and closing the press, such actuating device and control comprising an elongated longitudinally movable tubular member which is driven for such longitudinal movement by an axially fixed rotatably mounted screw, power means being employed reversely to rotate the screw with drive means interconnecting the tubular member and screw operative to convert rotational movement of the screw into linear movement of the tubular member, such rotational movement being monitored to obtain precise control of the linear movement.

---

This invention relates generally as indicated to an actuating device and control for a tire curing press and more particularly to a tire curing press utilizing an operating device for a bladder, loader, centering mechanism, etc., which will obtain more precise movement control and also provide the ability to obtain the desired movement in a simplified manner.

Presently, pneumatically operated bladder rams and the like are employed for stripping bladders from the interior of tires within a tire press and these rams may additionally operate tire stripping chucks as seen in Mallory et al. Patent No. 3,097,394. Vertically movable rams or tubes may also be employed to actuate tire loaders as seen in applicant's copending application, Ser. No. 444,530, filed Apr. 1, 1965, now Patent No. 3,378,882, entitled "Tire Curing Press." The speed of movement of such pneumatically operated rams or tubes cannot readily be controlled and they require packings or glands which create maintenance problems especially in the wide temperature variations which may occur in a tire curing press. Moreover, to obtain variations in stroke length, latch mechanisms or stops must be provided as seen in the aforementioned Mallory et al. patent or limit switches may require to be repositioned.

With a pneumatically operated ram, it is impossible to provide any degree of sophisticated control without such complex latch or stop mechanisms which would enable the ram to be employed to manipulate the bladder for shaping or the loading of green tires. For example, during shaping pauses it may be desired to strip or partially strip the bladder from the partially shaped tire to ensure proper bladder centering and to remove air which may be trapped between the bladder and the interior of the green tire. Further, in large presses, the extent of the ram stroke may prevent the opening of the press without complete retraction of the ram to an up-latched position which in turn may create additional problems in the stripping of the cured tire from the mold. With more and more sophisticated techniques being employed for the loading, shaping and curing of tires, it is highly desirable that an actuating mechanism for the bladder, loader or centering mechanism, for example, be capable of achieving a variety of stroke positions or speeds without requiring complex mechanical or electrical adjustments which may result in substantial down-time for the press.

It is accordingly a principal object of the present invention to provide a tire curing press having a bladder, loader, centering mechanism or the like operating member which can be extended to an infinite number of positions between the limits of its stroke.

Another principal object is the provision of a bladder or the like ram which can much more easily be manipulated to the desired position at different speeds thereby affording more sophisticated control of the loading or shaping, etc. operations.

A further object is the provision of a bladder or the like ram which employs a rotary drive, the rotational position of can be monitored to determine the linear position of the ram.

Another object is the provision of a tire curing press having a bladder or the like ram which includes a reversely rotationally driven screw or the like which is drivingly interconnected to the ram.

A still further object is the provision of a bladder ram which may be driven by an electric or air motor rather than a pneumatic piston-cylinder assembly thus avoiding the maintenance and leakage problems inherent in the latter.

A yet further object is the provision of a bladder and the like ram, the position of which can continually be monitored and which can be caused to respond to commands from a prepared program.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 4 is an enlarged horizontal section illustrating the details of the actuator taken substantially on the line 4—4 of FIG. 1;

FIG. 5 is a schematic piping diagram illustrating the operation and drive for the bladder rams;

FIG. 6 is a fragmentary vertical section through the base of a press illustrating another embodiment of the present invention; and FIG. 7 is a schematic wiring diagram illustrating the controls which may be utilized with the present invention to obtain a substantially infinite number of operating positions.

Figure 1:
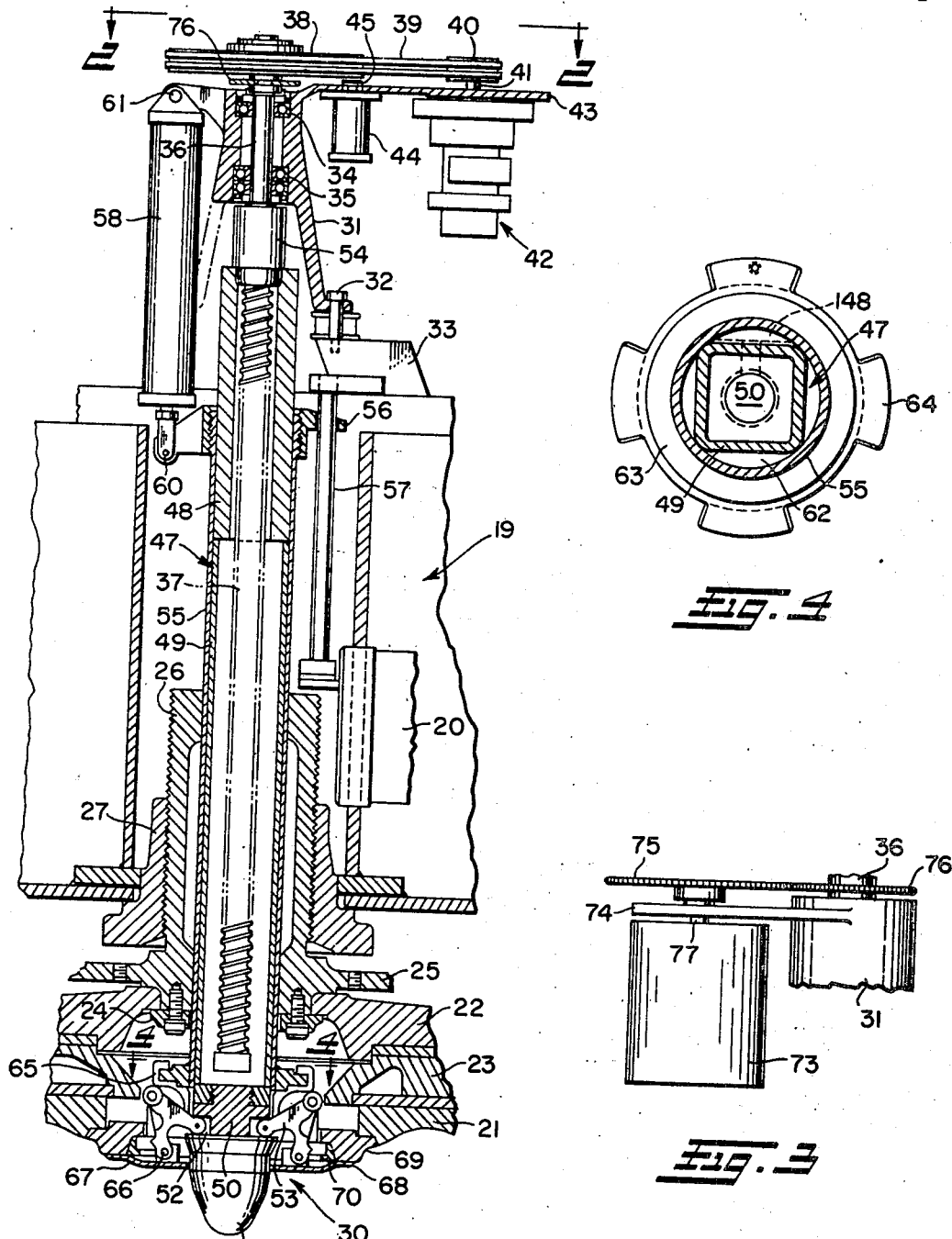
FIG. 1 is a fragmentary vertical section taken through the head and upper mold section of a tire curing press illustrating one embodiment of the present invention of an actuating device for a bladder ram and tire stripping chuck.
Figure 2:
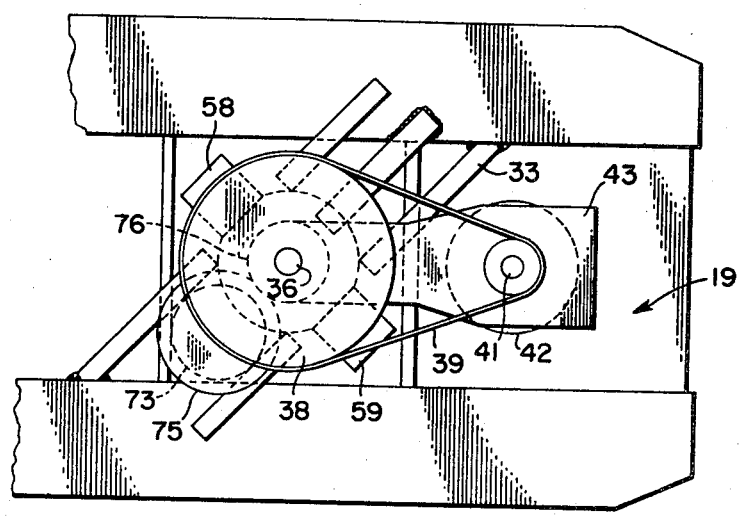
FIG. 2 is a fragmentary top plan view of the apparatus seen in FIG. 1 taken substantially from the line 2—2 thereof.

Referring now to the annexed drawings and first to FIGS. 1, 2 and 6, it will be appreciated that a tire curing press may comprise a base 1 supporting a lower or stationary mold section 2 as seen in FIG. 6. The base comprises a fabricated frame which includes top and bottom plates 3 and 4 with the lower mold section 2 being supported on platen 5 on the top plate 3. Vertical frame plates as indicated at 6 and 7 journal large diameter pins 8 which project from the ends of the base through vertically extending side cam plates 9 and 10. On the projecting ends of the large pins there is secured bull gears 11 and 12 reversely driven for rotation through a drive unit, not shown. Such bull gears are driven at the same rate of speed and aligned pins 14 and 15 project from the bull gears and have journalled thereon large side links 16 and 17, respectively.

These side links are connected to a beam or head 19 as seen in FIGS. 1 and 2 through inwardly directed pins which extend through cam slots in the side plates 9 and 10. The beam or head 19 may be of a fabricated frame structure which supports the upper mold sections indicated at 21 through bolster 22 with upper platen 23 therebetween. The bolster may be secured by ring 24 to rotatable adjusting gear 25 which includes a threaded shank 26 mounted in nut 27 secured to the beam 19.

To open the press, the bull gears are rotated to cause the links 16 and 17 to lift the head or beam 19 vertically away from the base 1 vertically separating the upper and lower mold sections 21 and 2. The pins 20 supporting the head or beam 19 move upwardly through vertical slots to separate the mold sections and then the head moves backwardly with the pins 20 riding on the top cam surface of the plates 9 and 10. The press as above-described is generally conventional and reference may be had to Heston et al. U.S. Patent No. 3,229,329 for a more clear disclosure of a tire curing press of the type with which the present invention can be used.

In addition to the basic structure above-described, tire curing presses may be provided with accessory equipment which may include loaders, tire shaping bladders, or center mechanisms which clamp and shape the tire beads in the case of bladderless curing. In the case of bladder mechanisms, two types are currently commercially employed, one utilizing a well in the bottom mold section and a vertically movable ram in the top mold section which when extended pushes the bladder into the well turning the same inside out. At the conclusion of the cure cycle, the extension of the ram will strip the bladder from the tire and the extension of the ram may be employed during the initial shaping of the tire during shaping pauses to manipulate the bladder for proper centering and to remove air pockets between the bladder and the tire. The other type of commercially employed bladder mechanism is one that is mounted in an upstanding position on the bottom mold section with the upper end of the bladder being connected to a ram which when extended will strip the bladder from the tire.

In the embodiment of the invention disclosed in FIGS. 1 through 5 and 7, there is shown a bladder ram actuating mechanism which may be of the type which extends to invaginate the bladder into the well. The ram also functions to operate a tire stripping chuck shown generally at 30 in FIG. 1.

Referring now more particularly to the embodiment of FIG. 1, it will be seen that the beam 19 is provided with a stanchion 31 secured by suitable fasteners 32 to the supports 33 on the top of the beam 19. Journalled in the stanchion as indicated at 34 and 35 is the upper end 36 of ball screw 37. The screw projects beyond the upper end of the stanchion and has secured thereto a double row sheave 38 which may be driven by V-belts 39 which are reversely rotatably driven by drive sheave 40 mounted on the drive shaft 41 of air motor 42. The air motor 42 is mounted on the underside of plate or bracket 43 which extends laterally from the upper end of the stanchion 31. Also mounted on the underside of the bracket 43 is a pneumatic brake piston-cylinder assembly 44, the brakeshoe or piston 45 of which extends through the bracket plate. The brakeshoe when extended will bear against the underside of the sheave 38.

The ball screw 37 extends down within tubular ram 47 which includes an upper cylindrical member 48 having a relatively large wall thickness and a lower tubular member 49 having a somewhat smaller wall thickness and which is square in section configuration as seen more clearly in FIG. 4. The O.D. of the tubular member 49 diagonally across the corners is the same as the O.D. of the circular member 48.

Stem 50 of ball nose 51 is threadedly secured to the lower end of the ram and as seen, such stem is provided with an annular groove 52 which engages the inner arms of bell cranks 53 operating the tire stripping chuck 30. At the upper end of the ram 47 there is secured a ball nut 54 in mesh with the ball screw 37 which converts the rotational movement of the screw into linear movement of the ram.

The ram is surrounded by an outer tire ejector tube 55 to the upper end of which a collar 56 is secured through which passes fixed guide rod 57 which also controls the limits of movement of the outer tube. Pneumatic piston-cylinder assemblies 58 and 59 on diametrically opposed sides of the stanchion 31 as seen in FIG. 2 have their rod ends connected to the collar 56 as seen at 60. The upper or blind ends of the piston-cylinder assemblies are connected at 61 to the top of the stanchion 31. The lower end of the square tube 49 extends through and is guided in a square opening in the bottom closure 62 of outer tube 55, as seen in FIG. 4.

The exterior lower end of the outer tube 55 is provided with a ring 63 having quadrant spaced tabs 64 seen more clearly in FIG. 4 which provide a bayonet type lock for the spider 65 to which the bell cranks 53 are pivoted. The other or lower arm of each bell crank is pivoted at 66 to a plate-like tire stripping chuck element. When the bell cranks are pivoted by the vertical movement of the bladder ram, the plates 67 move radially outwardly so that the outer peripheral edges 68 move beneath the upper bead ring 69 to confine the upper bead of the tire for movement with the top mold section. The top bead ring 69 is secured to the ring 70 which is a part of the spider 65 and moves vertically with the spider when the outer tube 55 is moved. This movement will strip the tire from the top mold section 21. When the bladder ram is retracted to its uppermost position as seen in FIG. 1, the flared lower edge 71 of the groove 52 will cause the bell cranks to pivot the plates 67 radially inwardly to the position shown.

Figure 3:
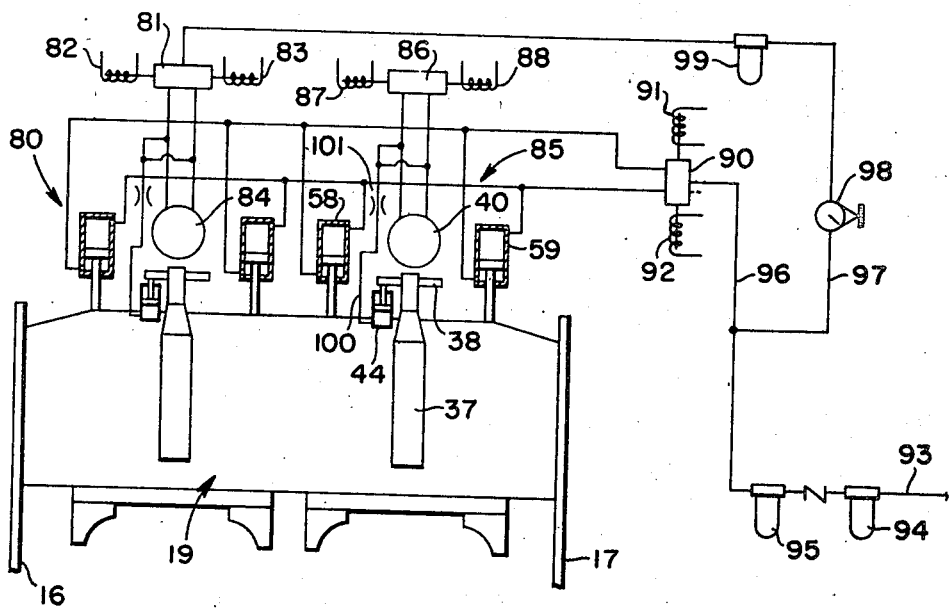
FIG. 3 is an enlarged fragmentary side elevation of the position sensor employed to monitor the actuator.

In order to monitor the vertical position of the ram 47, there is provided a position sensor 73 seen in FIGS. 2 and 3 which is mounted on the underside of bracket plate 74 extending from the upper end of the stanchion 31. Such position sensor may be in the form of a rotary potentiometer which is driven from the upper end of the screw 37 by meshing gears 75 and 76, the latter being keyed to the upper end 36 of the screw while the former is secured to the potentiometer shaft 77. The spur gearing 75–76 translates the rotary motion of the screw 37 to the sensor 73 such that X number of revolutions of the sensor shaft 77 may correspond to Y inches of linear movement of the bladder ram 47.

Referring now to FIG. 5, there is illustrated schematically the head 19 of a dual cavity press which includes left and right hand bladder ram units which may be identical in form. The left-hand unit shown schematically at 80 is controlled by double solenoid four-way valve 81 with the solenoids 82 and 83 being energized selectively to drive reversely the air motor 84. Similarly, the right-hand unit shown schematically at 85 is controlled through double solenoid valve 86 with the solenoids 87 and 88 being energized selectively reversely to drive the air motor 40. The tire ejector piston-cylinder assemblies 58 and 59 of each unit may be controlled through double solenoid valve 90 with solenoid 91 being energized to extend the assemblies and 92 being energized to retract the assemblies.

To operate the various components, factory air may be supplied from source 93 through filter 94 and lubricator 95 then through line 96 to the valve 90 and line 97 to the valves 81 and 86. A pressure regulator 98 and additional lubricator 99 may be provided in the line 97 to the motors 84 and 40.

From the valves 81 and 86 to the motors 84 and 40, respectively, there are two lines which may alternatively be pressurized depending upon the direction of rotation of the motor. The blind end of each brake cylinder 44 is connected through line 100 and flow control valve 101 to both of the lines leading from the control valves to the motor. In this manner, the brake may act as a retarding device or drag brake precluding overtravel of the screw when the valve 86 is shifted.

In the embodiment of FIG. 6, there is shown an upstanding bladder type of press of the type shown in Ulm et al. copending application, Ser. No. 610,419, filed Jan. 19, 1967, entitled "Tire Curing Press." In this type of press, the vertically extensible ram in the upper mold section need not be employed, but as indicated in such copending application, a tire stripping chuck operated by a relatively shorter stroke ball nose device may be employed. The shaping bladder 105 having a beaded edge at its lower end is secured between bottom bead ring 106 and spray ring 107, the latter being threadedly secured to the upper end of vertical support member 108. The support member is tubular in form and is provided with an interior stop 109 and is mounted on the rods 110 of vertically extending piston-cylinder assemblies 111, the blind ends of which may be supported on the bottom plate 4 of the base 1. A boss 113 is secured to the bottom plate and journals therein ball screw 114 which extends upwardly through the support 108. The ball screw extends through and is in mesh with ball nut 115 to which is secured the tubular bladder ram 116. A cup member 117 is secured by suitable fastener 118 to the top of the bladder ram and it will be noted that the fastener also extends through the relatively thick molded portion of the bladder forming the socket 119.

The screw may be driven from reversible air motor 120 mounted on bracket 121 driving the screw through double row V-belt sheaves and the associated V-belts indicated generally at 122. A holding brake 123 is provided as as in the FIG. 1 embodiment and a spur gear 124 mounted on the lower end of the screw shaft may be employed to drive a position sensor to monitor the vertical position of the ram.

As seen in FIG. 7, there is illustrated a schematic wiring diagram for the embodiment of FIG. 1 which can readily be modified for the FIG. 6 embodiment. Down and up relays 127 and 128 may be energized by the closing of switch contacts 129 and 130, respectively. These switch contacts may be closed by cams or limit devices operated by the position of the press or by a timer signalling the conclusion of the cure cycle. For example, at the conclusion of the cure cycle, the contacts 129 may be closed energizing relay 127 in turn closing contacts 131 and 132 energizing solenoids 83 and 88, respectively, through normally closed contacts 133 and 134. This will now energize the drive motors 84 and 40 seen in FIG. 5 driving the rams down. The extent to which the rams are driven downwardly is controlled by the opening of contacts 133 and 134 which open in response to a pulse from the relays 135 and 136, respectively, of servo amplifiers 137 and 138. Such servo amplifiers compare the settings of dial potentiometers 139 and 140 with the position sensors 73 monitoring the position of the rams. When a null balance is obtained, the amplifiers will open the contacts 133 and 134 stopping the descent of the rams. The servo amplifiers may, when they open contacts 133 and 134, close contacts 142 and 143 preparing circuits to the ram up solenoids 82 and 87. These, of course, will be energized when the up relay 128 is energized closing contacts 144 and 145.

Before the up relay 128 is energized, contacts 146 and 147 may be closed which are in parallel with the contacts 133 and 134 again to energize the solenoids 83 and 88 causing the ram to descend further. This mode of operation may be employed in the FIG. 1 embodiment or in the FIG. 6 embodiment to cause the ram to engage a stop as seen at 148 in FIG. 4 so that the ram will drive the outer ejector tube in the FIG. 1 embodiment or the support 108 in the FIG. 6 embodiment to move the tire bead ring mounted thereon axially with respect to the associated mold section. In this mode of operation, the force of the motor driving the ram through the ball screw would overcome the relatively low pressure in the rod ends of the piston-cylinder assemblies 58 and 59 or 111. Then, when the ram is reversed by the energization of the relay 128, the pressure in the rod end of the ejector piston-cylinder assemblies will cause the bead ring again to seat in the mold section as the ram is retracted.

It will, of course, be appreciated that other forms of operation may be employed and reference may be had to the copending application of Thomas C. Jones et al., entitled "Tire Curing Apparatus," Ser. No. 686,590, filed Nov. 29, 1967, for an example of how the present invention may be utilized in a completely automatic tire curing press operating in response to a prepared program. Sequencing devices may be employed as shown in such copending application so that the ram or actuating mechanism will stop at any number of programmed positions. It will also be appreciated that in view of the air motors illustrated, reversible variable speed electric drive motors may be employed.

It can now be seen that there is provided a tire press and actuating mechanism therefor in which the mechanism can be stopped at an infinite number of positions between the limits of its stroke. The mere setting of a dial or dials or the use of a program can preset the device to stop at the desired position when that position is achieved. Moreover, the actuating mechanism driven for reverse rotation through either an electric motor or an air motor avoids the need for latch mechanisms or limit switches and the down-time required to adjust the same and further eliminates the problems of air leakages and maintenance in pneumatically operated rams.

Other modes of applying the principle of the invention may be employed, change being made as regards the details described, provided the features stated in any of the following claims, or the equivalent of such, be employed.

I, therefore, particularly point out and distinctly claim as my invention:

1. In a tire curing press having relatively movable mold sections, an actuating device for operating and controlling the extent of movement of a part associated with said press comprising an elongated member axially movable with respect to said press, a rotatably mounted screw within said member, power means operative reversely to rotate said screw, drive means interconnecting said member and said screw operative to convert rotational movement of said screw into linear movement of said member for effecting movements of said part, and means to control the rotation of said screw to move said part to a predetermined position at a predetermined time during the operation of said press.

2. A tire curing press as set forth in claim 1 including means operative to monitor the linear position of said member.

3. A tire curing press as set for in claim 2 wherein said last mentioned means comprises a rotary potentiometer driven for rotation from said screw.

4. A tire curing press as set forth in claim 3 including means operative to stop said member at a predetermined position by comparing the position of said rotary potentiometer with another preset potentiometer to de-energize said power means.

5. A tire curing press as set forth in claim 4 wherein said power means comprises an air motor, and a solenoid operated valve controlling said air motor, said means operative to stop said member shifting said valve.

6. A tire curing press as set forth in claim 1 wherein said member comprises a bladder ram and said part is a curing bladder which is manipulated by said ram.

7. A tire curing press as set forth in claim 6 including a tire ejector tube surrounding said member, and stop means interconnecting said member and said ejector tube operative to move the latter during a portion of the stroke of the former.

8. A tire curing press as set forth in claim 1 wherein said drive means includes a ball nut mounted on said member in driven engagement with said screw.

9. A tire curing press as set forth in claim 1 wherein said power means comprises an air motor, and brake means operative to prevent overtravel when said motor is de-energized.

10. A tire curing press as set forth in claim 1 wherein said member comprises a chuck operator, the linear movement of said member expanding and contracting said chuck.

References Cited

UNITED STATES PATENTS

| | | |
|---|---|---|
| 2,559,119 | 7/1951 | Frank. |
| 2,730,763 | 1/1956 | Brundage. |
| 2,736,059 | 2/1956 | Frank. |
| 2,743,480 | 5/1956 | Frank. |
| 2,763,317 | 9/1956 | Ostling et al. |
| 2,778,060 | 1/1957 | Brundage. |
| 2,858,566 | 11/1958 | Brundage. |
| 3,191,235 | 6/1965 | Rougement. |
| 3,337,918 | 8/1967 | Pacciarini et al. |
| 3,396,221 | 8/1968 | Balle et al. |

J. HOWARD FLINT, Jr., Primary Examiner

U.S. Cl. X.R.

18—30, 43